(12) United States Patent
Kokabu

(10) Patent No.: US 7,474,844 B2
(45) Date of Patent: Jan. 6, 2009

(54) CAMERA EQUIPMENT WITH MOVABLE LENSES AND METHOD OF CONTROLLING LENS DRIVING OPERATION

(75) Inventor: Daisuke Kokabu, Kunitachi (JP)

(73) Assignee: Casio Computer Co., Ltd., Tokyo (JP)

( * ) Notice: Subject to any disclaimer, the term of this patent is extended or adjusted under 35 U.S.C. 154(b) by 329 days.

(21) Appl. No.: 11/294,697

(22) Filed: Dec. 5, 2005

(65) Prior Publication Data

US 2006/0127076 A1 Jun. 15, 2006

(30) Foreign Application Priority Data

Dec. 10, 2004 (JP) ............................. 2004-358421

(51) Int. Cl.
*G03B 17/00* (2006.01)
*G03B 13/00* (2006.01)

(52) U.S. Cl. ............................. 396/70; 396/81; 396/82; 396/86; 348/240.99; 348/345

(58) Field of Classification Search ................... 396/79, 396/80, 81, 86, 82; 348/208.12, 240.99, 348/345
See application file for complete search history.

(56) References Cited

U.S. PATENT DOCUMENTS 4,847,650 A * 7/1989 Iida et al. ..................... 396/82

FOREIGN PATENT DOCUMENTS

JP 6-62299 A 3/1994

* cited by examiner

*Primary Examiner*—Rochelle-Ann J Blackman
(74) *Attorney, Agent, or Firm*—Frishauf, Holtz, Goodman & Chick, P.C.

(57) ABSTRACT

In a camera, a zoom lens and focus lens are driven to predetermined positions corresponding to a zoom magnification factor to be changed upon a demand for altering the zoom magnification factor. During a zooming operation after the camera has been brought into focus by an auto-focusing function, driving rates of the zoom lens and focus lens are controlled in each of zoom intervals to set driving times required to drive the zoom lens and focus lens to positions corresponding to the next zoom magnification factor to the quickest zoom driving time Tz of the zoom lens and the longer driving time among the quickest focus driving times Tfa, Tfb of the focus lens corresponding to object distances.

6 Claims, 8 Drawing Sheets

| OBJECT DISTANCES | ZOOM POSITIONS (ZOOM MAGNIFICATION FACTORS) | | | | | | | |
| --- | --- | --- | --- | --- | --- | --- | --- | --- |
| | WIDE (1-FOLD) | WIDE+1 (1.5-FOLD) | MID-1 (2-FOLD) | MID (2.5-FOLD) | MID+1 (3-FOLD) | TELE-1 (3.5-FOLD) | TELE (4-FOLD) | |
| ∞ | F(1,A) | F(1.5,A) | F(2,A) | F(2.5,A) | F(3,A) | F(3.5,A) | F(4,A) | ... |
| ... | ... | ... | ... | ... | ... | ... | ... | |
| 5m | F(1,B) | F(1.5,B) | F(2,B) | F(2.5,B) | F(3,B) | F(3.5,B) | F(4,B) | ... |
| ... | ... | ... | ... | ... | ... | ... | ... | |

FIG. 3

| ZOOM POSITIONS (ZOOM MAGNIFICATION FACTORS) | | WIDE (1-FOLD) | WIDE+1 (1.5-FOLD) | MID-1 (2-FOLD) | MID (2.5-FOLD) | MID+1 (3-FOLD) | TELE-1 (3.5-FOLD) | TELE (4-FOLD) |
|---|---|---|---|---|---|---|---|---|
| NUMBER OF ZOOM PULSES | | 0 | 150 | 250 | 310 | 360 | 410 | 470 |
| NUMBER OF FOCUS PULSES | OBJECT DISTANCE A (∞m) | 0 | 150 | 75 | 25 | 40 | 125 | 225 |
| | ... | | | | | | | |
| | OBJECT DISTANCE B (5m) | 10 | 110 | 60 | 50 | 70 | 85 | 160 |
| | ... | ... | ... | ... | ... | ... | ... | ... |

102

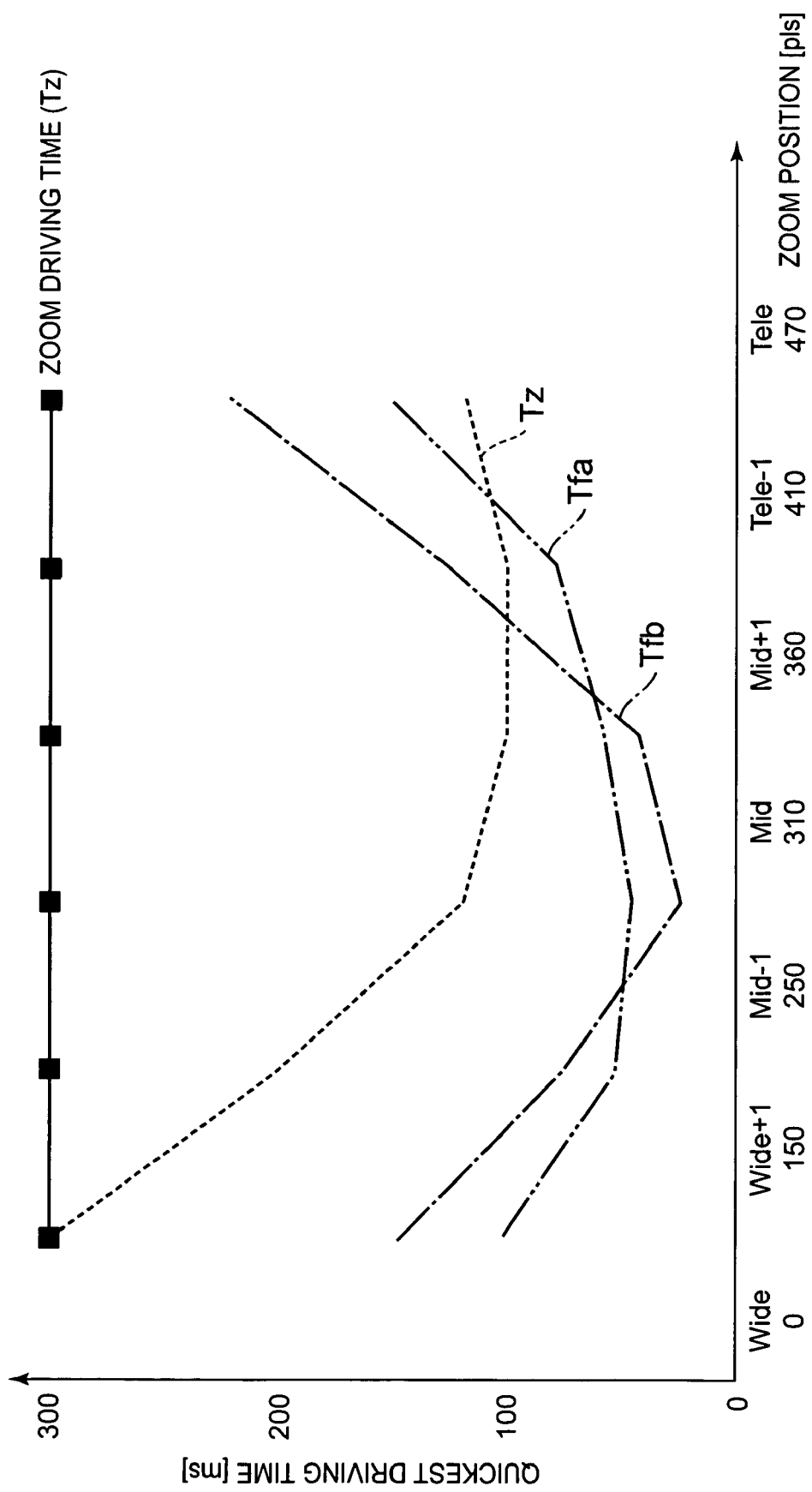

CAMERA EQUIPMENT WITH MOVABLE LENSES AND METHOD OF CONTROLLING LENS DRIVING OPERATION

BACKGROUND OF THE INVENTION

1. Field of the Invention

The present invention relates to camera equipment with a zoom function and auto-focus function and a method of controlling an optical lens system in the camera equipment.

2. Description of the Related Art

Most of conventional digital cameras are equipped with a zoom function and auto-focus function. In general, zoom lens used in a digital camera alters an object distance, at which an image of an object can be brought into focus (focused focal position), as a zoom position alters. When the zoom position alters with an object image kept in focus, the focus lens is controlled so as to move to a position corresponding to the object distance at the altered zoom position after the zooming operation has been completed.

Since the above controlling operation can bring an object image out of focus during the zooming operation, such controlling operation has a disadvantage that it is not proper for photographing a moving image. A method of solving the disadvantage is proposed, for example, in Patent Document #1, in which method a focus speed (moving speed of a focus lens) is increased or decreased centering around an ideal speed at which the focus lenses move precisely after the focused focal lens locus, on the basis of levels (contract rate) of high frequency components contained in a video (image) signal obtained during the zooming operation. This method restricts object-image defocusing of more than a certain level during the zooming operation, and keeps object-image defocusing within an allowable range during the zooming operation.

[Patent Document #1] Japanese Laid-open Patent Specification Hei 6-62299, Paragraphs [0037] to [0045]

In this method, however, high frequency components contained the video (image) signal are successively detected and the focus speed is frequently altered based on the detected high frequency components, which causes a serious problem that increases burden imposed on the camera equipment (specifically, control unit in a micro computer) performing the above operation during the zooming operation.

The present invention has been made in consideration of the above problems, and it is an object of the present invention to provide camera equipment, a method of controlling an optical lens system in the camera equipment, and a program for performing the method, which is capable of keeping defocus of an object image within an allowable range by a simple control operation.

SUMMARY OF THE INVENTION

According to one aspect of the invention, there is provided camera equipment having a zoom function and auto-focus function, which comprises a distance-information obtaining unit for obtaining distance information representing an object distance, a zoom driving unit for driving a zoom lens, a focus driving unit for driving a focus lens, a drive controlling unit for making the zoom driving unit drive the zoom lens in response to a demand for altering a zoom magnification factor, to alter the zoom magnification factor, and for making the focus driving unit drive the focus lens in synchronization with driving of the zoom lens by the zoom driving unit, and further for adjusting such positions of the focus lens that the zoom magnification factor is set to plural predetermined zoom magnification factors to focus positions each corresponding to an object distance and position of zoom lens represented by the distance information which has been obtained by the distance-information obtaining unit immediately before the demand for altering the zoom magnification factor is made, and a driving-rate controlling unit for adjusting both a zoom driving rate at which the drive controlling unit makes the zoom driving unit drive the zoom lens and a focus driving rate at which the drive controlling unit makes the focus driving unit drive the focus lens to a driving rate that makes a zoom driving time of the zoom lens and a focus driving time of the focus lens coincide with each other in each of intervals corresponding respectively the plural predetermined zoom magnification factors.

According another aspect of the invention, there is provided a lens controlling method for controlling a zoom lens and focus lens in camera equipment with a zoom function and auto-focus function, which comprises the steps of: driving the zoom lens in response to a demand for altering a zoom magnification factor, to alter the zoom magnification factor; driving the focus lens in synchronization with driving of the zoom lens, adjusting such positions of the focus lens that the zoom magnification factor is set to plural predetermined zoom magnification factors to focus positions each corresponding to an object distance and position of zoom lens represented by the distance information which has been obtained immediately before the demand for altering the zoom magnification factor is made, and meanwhile adjusting both a zoom driving rate of the zoom lens and a focus driving rate of the focus lens to a driving rate that makes a zoom driving time of the zoom lens and a focus driving time of the focus lens coincide with each other in each of intervals corresponding respectively the plural predetermined zoom magnification factors.

According to still another aspect of the invention, there is provided a computer program for a computer installed in camera equipment having a zoom function and auto-focus function to realize functions of the following units, a drive controlling unit for making a zoom driving unit drive a zoom lens in response to a demand for altering a zoom magnification factor, to alter the zoom magnification factor, and for making the focus driving unit drive a focus lens in synchronization with driving of the zoom lens by the zoom driving unit, and further for adjusting such positions of the focus lens that the zoom magnification factor is set to plural predetermined zoom magnification factors to focus positions each corresponding to an object distance and position of zoom lens represented by the distance information which has been obtained by a distance-information obtaining unit immediately before the demand for altering the zoom magnification factor is made, and a driving-rate controlling unit for adjusting both a zoom driving rate at which the drive controlling unit makes the zoom driving unit drive the zoom lens and a focus driving rate at which the drive controlling unit makes the focus driving unit drive the focus lens to a driving rate that makes a zoom driving time of the zoom lens and a focus driving time of the focus lens coincide with each other in each of intervals corresponding respectively the plural predetermined zoom magnification factors.

With the arrangement of the invention, it is possible in camera equipment having a zoom function and auto-focus function to bring images of out of focus during a zooming operation in an allowable condition by a simple control operation.

BRIEF DESCRIPTION OF THE DRAWINGS

FIG. 2 is a view schematically showing data structures in a focus-lens position distance conversion table.

FIG. 3 is a view schematically showing data structures in a lens position obtaining table.

FIG. 8 is a view showing zoom driving times in the second embodiment of the invention.

DETAILED DESCRIPTION OF THE PREFERRED EMBODIMENTS

Now, digital cameras according to embodiments of the present invention will be described with reference to the accompanying drawings.

First Embodiment

Figure 1:
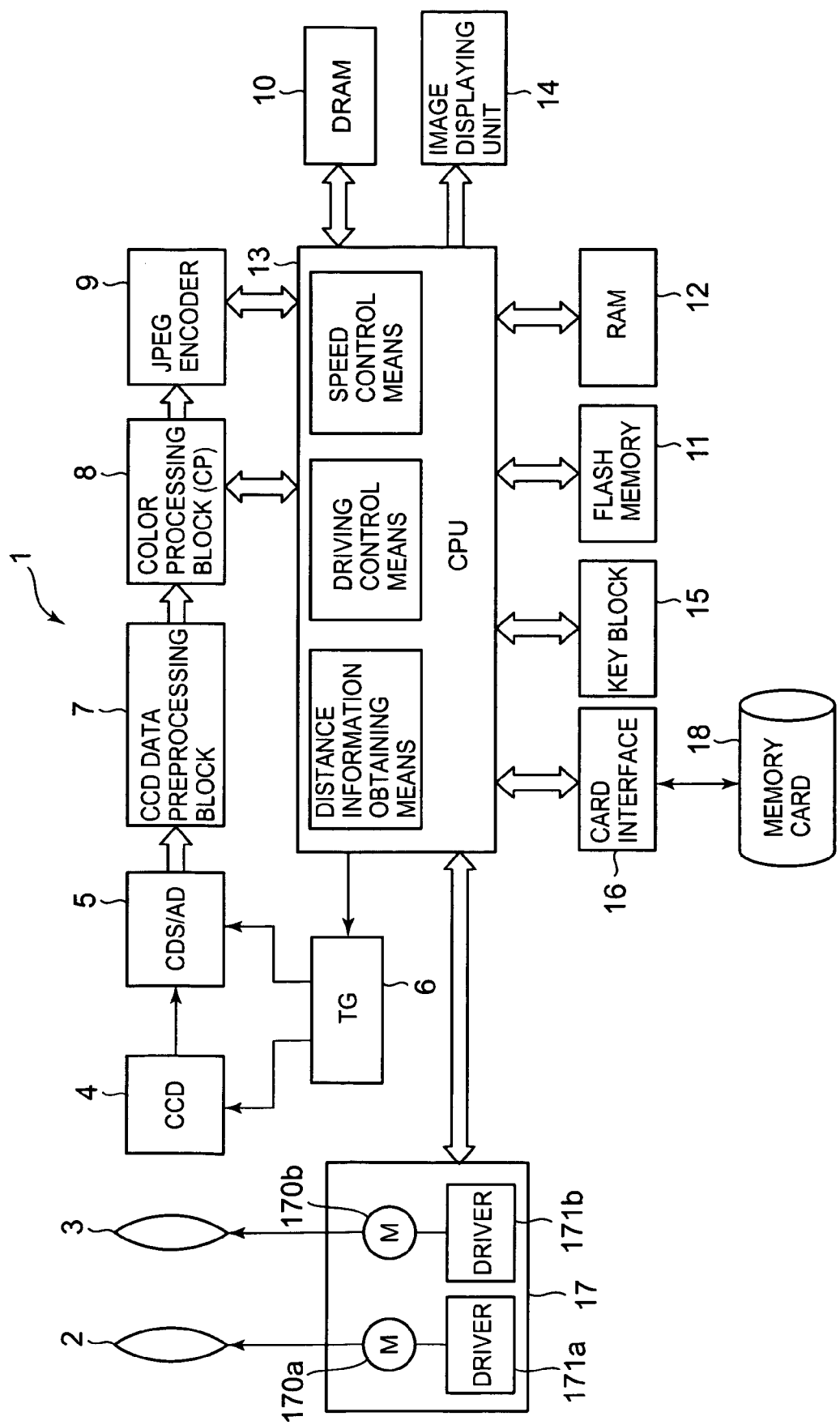
FIG. 1 is a block diagram showing a circuit configuration of digital camera equipment, which is commonly used in all embodiments of the invention.

FIG. 1 is a block diagram of a circuit configuration of digital camera equipment 1, which is commonly used in all the embodiments of the present invention. The digital camera equipment 1 has a zoom function and AF function. The digital camera equipment 1 comprises zoom lens 2, focus lens 3, CCD 4, CDS/AD block 5, a timing signal generator (TG) 6, CCD data preprocessing block 7, color processing (CP) block 8, JPEG encoder 9, DRAM 10, built-in flash memory 11, RAM 12, CPU 13, image displaying unit 14, key block 15, card interface 16, and motor driving block 17. To the card interface 16 is connected a memory card 18 detachably installed in a card slot (not shown) provided in the camera body.

The zoom lens 2 and focus lens 3 actually consist of plural lenses but each is illustrated with a single lens in FIG. 1 and expressed in a singular form hereinafter for simplicity. The motor driving block 17 comprises a zoom motor 170a for driving the zoom lens 2 along the optical axis, a focus motor 170b for driving the focus lens 3 along the optical axis, motor drivers 171a, 171b for driving the zoom motor 170a and focus motor 170b in accordance with a control signal supplied from CPU 13. The zoom motor 170a and focus motor 170b comprise stepping motors respectively, and operate in response to driving pulse signals transferred from the motor drivers 171a, 171b to drive the zoom lens 2 and focus lens 3 respectively. The zoom motor 170a and motor driver 171a compose a zoom driving unit of the invention and the focus motor 170b and motor driver 171b compose a focus driving unit of the invention.

In the present embodiment of the invention, the maximum speeds at which the zoom motor 170a can drive the zoom lens 2 and the focus motor 170b can drive the focus lens 3 are different from each other, and the zoom lens 2 can move at a rate of 500 pps (pulses/sec.), while the focus lens 3 can move at a rate of 1000 pps (pulses/sec.)

CCD 4 serves as an image pick-up unit, and performs photoelectric conversion on an image of an object projected through the zoom lens 2 and focus lens 3 to obtain and output an image pick-up signal. TG 6 generates a timing signal of a certain frequency to drive CCD 4. CDS/AD block 5 performs a sampling operation to convert the image pick-up signal output from CCD 4 into a digital signal with noises removed. CCD data preprocessing block 7 performs a data process such as a luminance signal process on the digitized image pick-up signal. The color processing (CP) block 8 executes a color signal process such as a color signal separation process on the image signal which has been subjected to the luminance signal process to generate Y, Cb and Cr image data. DRAM 10 stores Y, Cb and Cr data, which have been subjected to the color process, successively.

The image displaying unit 14 comprises a color LCD and a driving circuit for driving the color LCD. In a recording mode, the image displaying unit 14 displays a through image on the basis of image data for one frame image obtained by CCD 4 and stored in DRAM 10, while the digital camera equipment 1 is in a stand-by state for a photographing operation. In a reproducing mode, the image displaying unit 14 displays a recorded image on the basis of image data which is read out from the memory card 18 and extended, and further displays various sorts of information according to need.

JPEG encoder 9 compresses image data input from the color processing (CP) block 8 in conformity with JPEG standard. The memory card 18 stores image data which is sent through the card interface 16 and compressed in conformity with JPEG standard. When the image data recorded in this way is reproduced, the image data is read out from the memory card 18 and is extended by JPEG encoder 9 to be displayed on the image displaying unit 14. The key block 15 includes various sorts of operation keys such as a mode switching key used for switching an operation mode, for example, from a photographing mode to the reproducing mode and vice versa, a shutter key, a zoom key used to change a zoom magnification factor of the zoom lens 2, and the like. The key block 15 sends CPU 13 an operation signal corresponding to a key operation performed by a user. The shutter key has a so-called halfway pressing shutter function, and is constructed so as to allow a halfway-depressing operation, in which the shutter key is pressed down halfway to notify of taking a picture in advance, and a full-way pressing operation, in which the shutter key is released, instructing to taking a picture.

The flash memory 11 is a rewritable non-volatile memory. The flash memory 11 stores various sorts of data and programs necessary for CPU 13 to perform control operations of the digital camera equipment 1 such as AF control, AE control, AWB control and the like. In the photographing mode, upon receipt of an operation signal from the key block 15, CPU 13 starts operation using RAM 12 as a working memory to serve as a distance information obtaining unit, a driving control unit, and a speed control unit of the present invention. The AF control operation uses a contrast detecting system, in which, while the zoom lens 2 is being moved along the optical axis, AF evaluation value (contrast value) is detected from an image at each position, and a position where AF evaluation value reaches the peak is set to a focused focal position.

The flash memory 11 serves as a storing unit of the present invention. The above various sorts of data include a focus-lens position-distance conversion table 101 shown in FIG. 2, and a lens position obtaining table 102 shown in FIG. 3, which are used for performing processes to be described later.

The focus-lens position-distance conversion table 101 (FIG. 2) is a table which gives focused focal positions (positions of focus lens 3) and corresponding distances form an object with respect to every zoom position (zoom magnification factors). In the present embodiment, a zoom position can be set to seven stages between "WIDE" side and "TELE" side (1-fold to 4-fold zoom magnification factor). The distance from an object falls within a range between an infinite distance and extremely close distance (∞ to 10 cm). Focused focal positions (F(1, A) to F(4, A), . . . F(1, B) to F(4, B), . . . ) are theoretical figures in design previously calculated depending on characteristics of the zoom lens 2 and focus lens 3.

The lens position obtaining table 102 (FIG. 3) shows control position information, which gives positions of the zoom lens 2 and focus lens 3 corresponding respective to zoom positions. The positions of the zoom lens 2 and focus lens 3 are represented with the number of driving pulses in the lens position obtaining table 102. The position of the zoom lens 2 is represented with the relative number of pulses calculated on the basis of the position of the zoom lens 2 staying at the "WIDE" side. The position of the focus lens 3 is represented with the relative number of pulses calculated on the basis of the position of the focus lens 3 staying at a predetermined position. The position of the focus lens 3 is a focused focal position where the focus lens 3 is brought into focus precisely on the object at an arbitrary zoom position, and is represented by a theoretical figure in design falling into a range (∞ to 10 cm) of the object distances.

Figure 4:
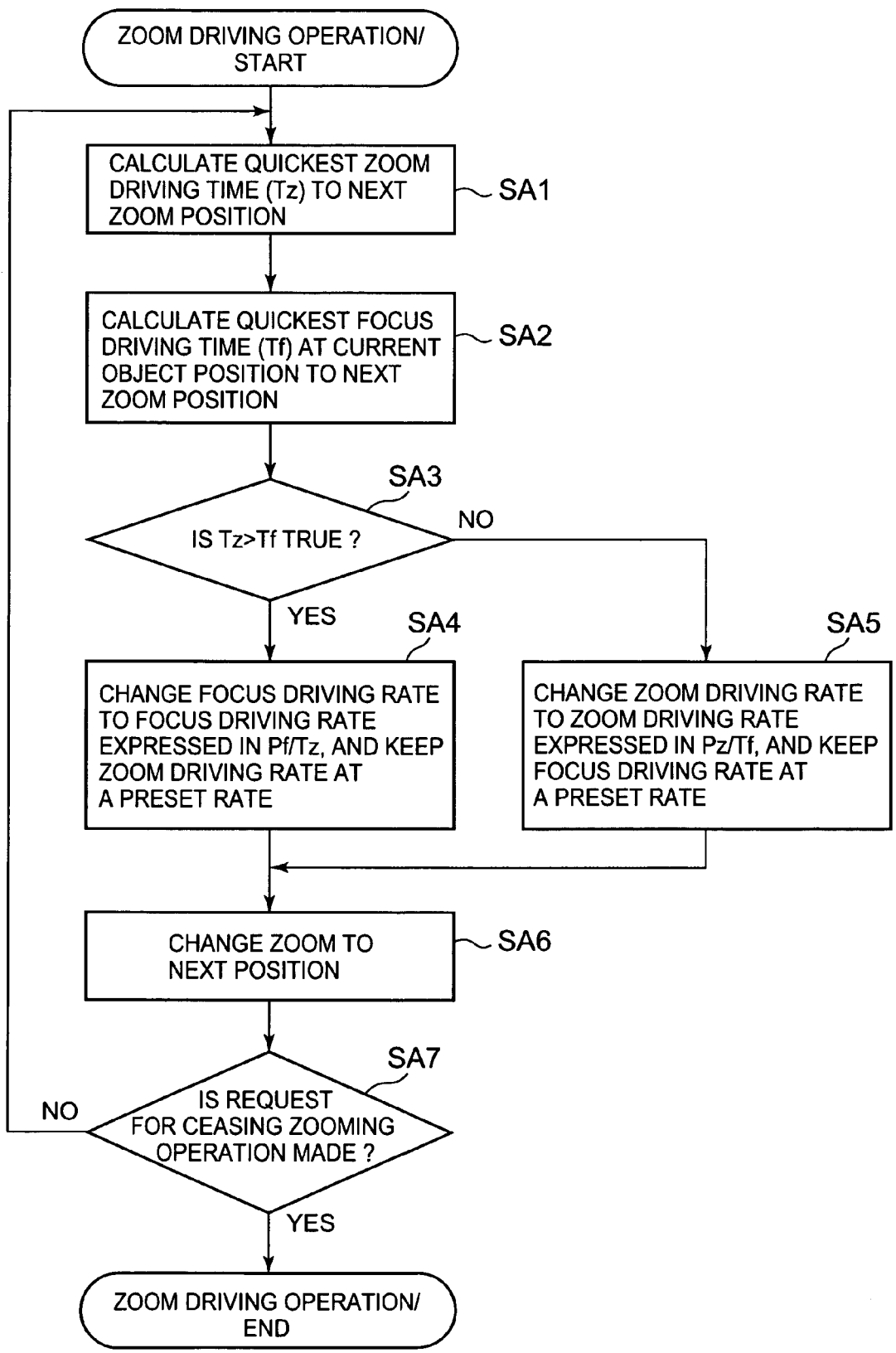
FIG. 4 is a flow chart showing zoom driving processes performed by CPU in a first embodiment of the invention.

Now, operation of the digital camera equipment 1 of the above arrangement according to the first embodiment of the invention will be described with reference to FIG. 4. FIG. 4 is a flow chart showing a zoom driving process performed by CPU 13 when the user operates the zoom key while the focus lens 2 staying at an arbitrary zoom position (zoom magnification factor) has been brought into focus by the AF control in the recording mode.

CPU 13 responds to the zoom key operation and calculates at step SA1 a time (quickest zoom driving time: Tz) required for driving the zoom lens 2 to the next zoom position at the highest rate. The quickest zoom driving time Tz is calculated using a zoom driving rate previously set at such time and the number (Pz) of zoom pulses given in the lens position obtaining table 102 (FIG. 3). Note that the quickest driving rate (500 pps) for driving the zoom lens 2 is used as the zoom driving rate in the initial calculating process. Further, a time (quickest focus driving time: Tf) required for driving the focus lens 3 corresponding to the current object distance to the next zoom position at the highest rate is calculated at step SA2. The quickest focus driving time Tf is calculated using a focus driving rate previously set at such time and the number (Pf) of focus pulses given in the lens position obtaining table 102 (FIG. 3). Note that the quickest driving rate (500 pps) for driving the focus lens 3 is used as the focus driving rate in the initial calculating process, and the object distance is obtained from the focus-lens position-distance conversion table 101 shown in FIG. 2, using a zoom position (zoom magnification factor) at such time and a focus position, i.e. a position to which the focus lens 3 is moved by AF control performed immediately before a zoom key operation.

Figure 5:
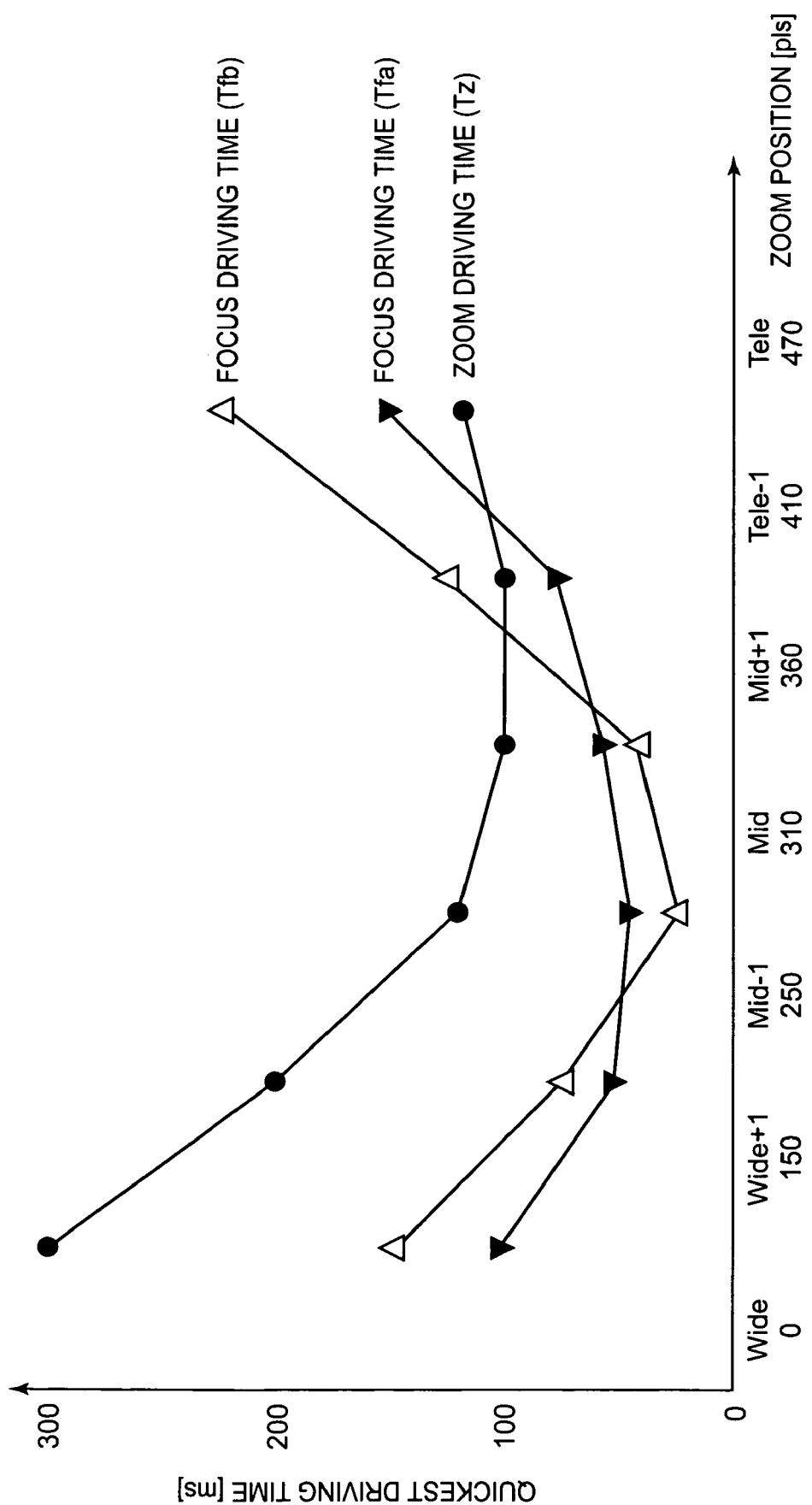
FIG. 5 is a view showing the quickest driving times of zoom lenses and focus lenses.

FIG. 5 is a graph showing the quickest driving times required to driving the zoom lens 2 and focus lens 3 from arbitrary positions to the next positions respectively, which are calculated at steps SA1 and SA2. For convenience, in FIG. 5 are shown only the quickest driving times of the focus lens 3 corresponding to different object distances A (∞) and B (5 m). As described above, moving amounts (the number of driving pulses) in a zoom interval between an arbitrary zoom position and the next zoom position are different for the zoom lens 2 and focus lens 3. Further, moving amounts of the focus lens 3 are different by the object distances. Therefore, even though the zoom lens 2 and focus lens 3 are driven at the quickest driving rates, the quickest driving times of the zoom lens 2 and focus lens 3 are different as clearly shown in FIG. 5. Further, for example, when the object distance is set to "A", the quickest driving times of the focus lens 3 from a zoom position of "Mid+1" to a zoom position of "Tele-1" and from a zoom position of "Tele-1" to a zoom position of "Tele" are longer than the quickest driving time of the zoom lens 2, and also when the object distance is set to "B", the quickest driving time of the focus lens 3 from a zoom position of "Tele-1" to a zoom position of "Tele" is longer than the quickest driving time of the zoom lens 2.

CPU 13 compares the calculated quickest zoom driving time Tz with the calculated quickest focus driving time Tf at step SA3. When it is determined at step SA3 that the quickest zoom driving time Tz is larger than the quickest focus driving time Tf (YES at step SA3), that is, when the object distance is "A" and the next zoom position is "Tele" in the initial process, and when the object distance is "B" and the next zoom position is "Tele-1" or "Tele", the focus driving rate is switched to a focus driving rate expressed in terms of "Pf/Tz", and the zoom driving rate is kept at a rate previously set at such time at step SA4. On the contrary, when it is determined at step SA3 that the quickest focus driving time Tf is larger than the quickest zoom driving time Tz (NO at step SA3), that is, when the object distance is "A" and the next zoom position is either of positions falling into a range between "Wide+1" and "Tele-1" in the initial process, and when the object distance is "B" and the next zoom position is either of positions falling into a range between "Wide+1" and "Mid+1", the zoom driving rate is switched to a zoom driving rate expressed in terms of "Pz/Tf", and the focus driving rate is kept at a rate previously set at such time at step SA5. Thereafter, the zoom lens 2 is driven to the next zoom position at the switched or maintained zoom driving rate, and a zoom changing operation is performed to drive the focus lens 3 at the switched or maintained focus driving rate at step SA6.

Figure 6:
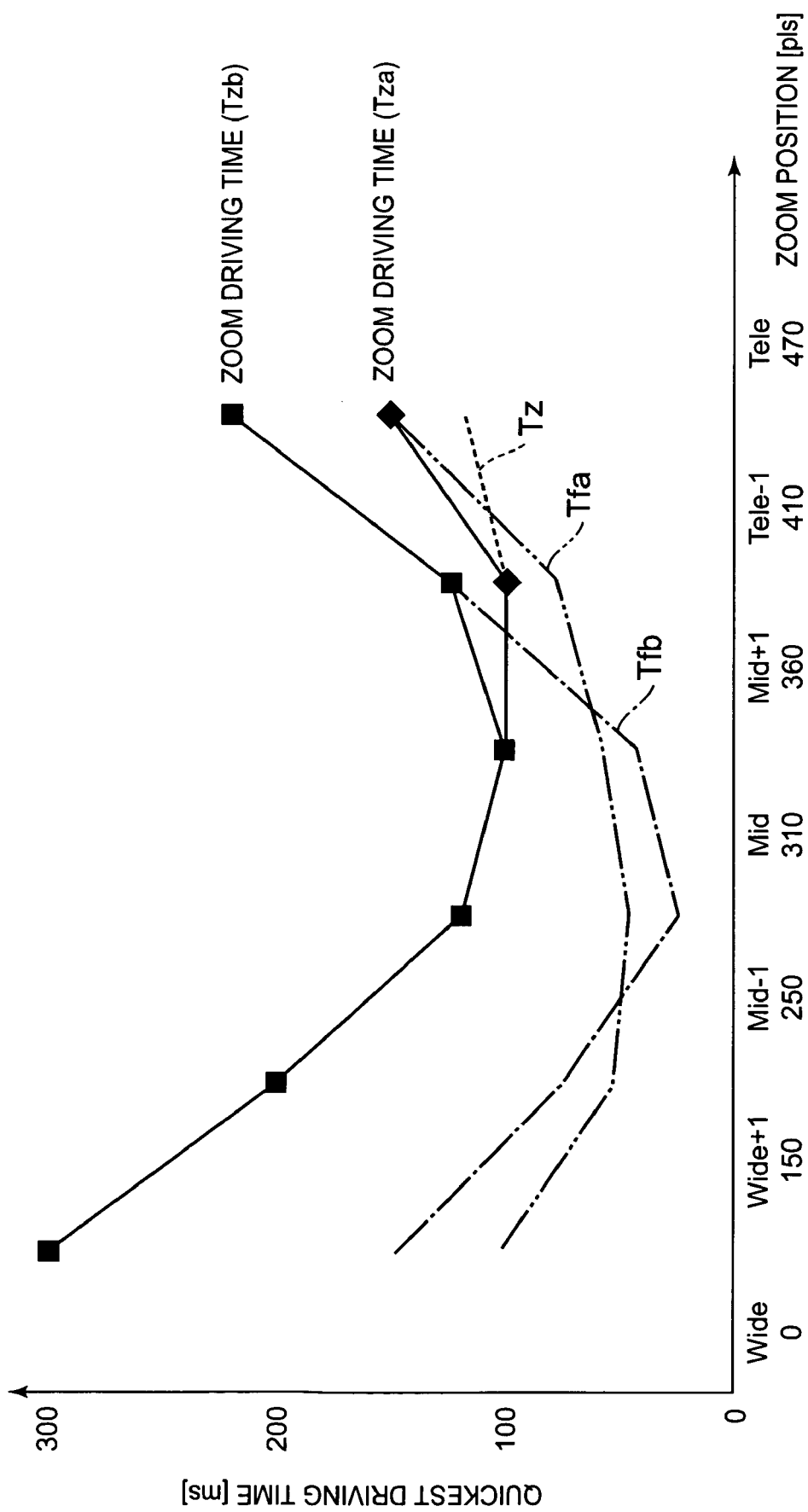
FIG. 6 is a view showing zoom driving times in the first embodiment of the invention.

Then, unless a request for ceasing the zooming operation is made or the user stops the zooming operation (NO at step SA7), CPU 13 returns to step SA1 and performs processes at steps SA1 to SA6 repeatedly. During the processes performed repeatedly at steps SA1 to SA6, the driving times of the zoom lens 2 and focus lens 3 are controlled to be set to a longer driving time among the quickest driving times of the zoom lens 2 and focus lens 3 in each zoom interval. FIG. 6 is a view corresponding to that of FIG. 5 which shows zoom driving times each required for the lenses controlled in the above manner to move from an arbitrary zoom position to the next zoom position. As shown in FIG. 6, for example, when the zoom position is changed from "Wide" to "Tele", the zoom driving time Tza for an object distance "A" and the zoom driving time Tzb for another object distance "B" become equivalent to the quickest driving time of the zoom lens 2 until the zoom position reaches to a position of "Mid+1", and thereafter, the zoom driving times Tza, Tzb become the quickest driving times of the focus lens 3 corresponding respectively to the object distances.

When the request for ceasing the zooming operation is made while the processes at steps SA1 to SA6 are performed repeatedly (YES at step SA7), then the zoom driving process is finished.

As described above, the driving times of the zoom lens 2 and focus lens 3 are made to coincide with each other at all times while the zoom position is being changed, whereby the focus lens 3 can be kept in the vicinity of the focus position corresponding to the object distance and the position of the zoom lens 3 at all times during the zoom driving process, without controlling the focus driving rate frequently. Therefore, during the zooming operation, it is possible not only to keep precise focused focal states at each of seven steps of zoom positions but also to keep a substantially precise focused focal state in each of zoom intervals. In other words, an out of focus state during the zooming operation can be brought into an allowable state by a simple control operation.

Further, the zooming operation can be performed more rapidly by simultaneously reducing as much as possible the driving rates of the zoom lens 2 and focus lens 3 for each zoom interval, that is, by shortening both the driving times of the lenses 2 and 3 as much as possible.

In the present embodiment of the invention, the zoom position can be set to seven stages within a range from "wide" side to "Tele" side (1-fold to 4-fold zoom magnification factor), but the number of stages to which the zoom position can be set may arbitrarily be increased or decreased. In case variation ranges in the zoom magnification factor are equivalent, more finely the zoom position is set, more precisely the focused focal state may be set during the zooming operation in each zoom interval.

Further, in the embodiment of the invention, the driving times of the zoom lens 2 and focus lens 3 are controlled to be set to the longer driving time among the quickest driving times of the zoom lens 2 and focus lens 3 in each zoom interval, whereby a more rapid zooming operation is performed at all times. Further, a modification may be made, for example, such that the zoom key is provided with an adjusting function which allows the user to adjust the zooming operation rate, whereby the driving times of the zoom lens 2 and focus lens 3 can be changed up to an upper limit of the driving time controlled and set in the above manner, in response to the rate adjusting operation performed by user during the zooming operation.

Second Embodiment

Now, an operation of the digital camera equipment 1 according to the second embodiment of the invention will be described with reference to FIGS. 7 and 8. Unlike the first embodiment of the invention, in the digital camera equipment 1 according to the second embodiment the zooming operation rate is controlled to be kept at a constant rate independently of the zoom interval.

Figure 7:
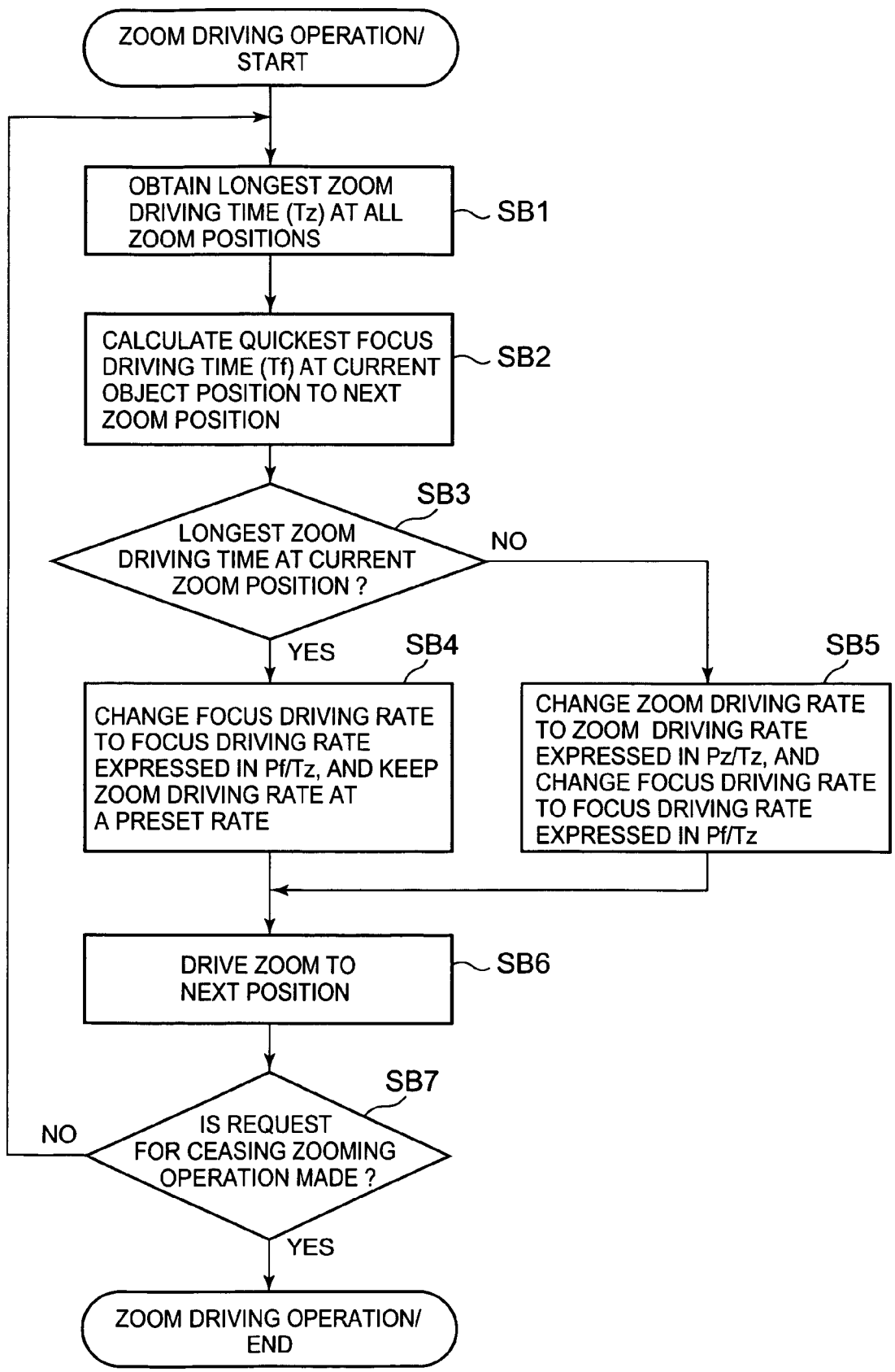
FIG. 7 is a flow chart showing zoom driving processes performed by CPU in a second embodiment of the invention.

FIG. 7 is a flow chart showing a zoom driving operation performed by CPU 13 when the zoom key is operated by the user while the camera equipment 1 is kept at an arbitrary zoom position and brought into focus by AF control operation in the recording mode.

In the second embodiment of the invention, CPU 13 responds to the zoom key operation by the user and obtains, from the zoom position obtaining table 102, the longest zoom driving time Tz among the quickest driving times of the zoom lens 2 for all the zoom positions at step SB1. Then, CPU 13 calculates the quickest driving time (quickest focus diving time Tf) of the focus lens 3 required to move to the next zoom position corresponding to the current object distance at step SB2. The calculation method of the quickest focus driving time Tf is the same as the method at step SA2 in the first embodiment.

CUP 13 confirms at step SB3 if the current zoom position is the zoom position ("Wide" side) which requires the longest zoom driving time to move to the next zoom position. When the result of the judgment at step SB3 is YES, the focus driving rate is changed to a focus driving rate expressed in terms of "Pf/Tz", and the zoom driving rate is kept at a rate previously set at such time at step SB4. On the contrary, when the current position is not at "Wide" side and the result of the judgment at step SB3 is NO, the zoom driving rate is changed to a zoom driving rate expressed in terms of "Pz/Tz", and the focus driving rate is changed to a focus driving rate expressed in terms of "Pf/Tz" at step SB5. Thereafter, the zoom changing operation is performed to drive the zoom lens 2 toward the next zoom position at the changed or maintained zoom driving rate and to drive the focus lens 3 at the changed focus driving rate at step SB6.

Then, CPU 13 returns to step SB1, and performs the processes at steps SB1 to SB6 repeatedly until a request for ceasing the zooming operation is made or the user stops the zooming operation (NO at step SB 7). During the processes repeatedly performed at steps SB1 to SB6, the driving times of the zoom lens 2 and focus lens 3 are controlled to be set to a longer driving time among the quickest driving times of the zoom lens 2 and focus lens 3 in each zoom interval. FIG. 8 is a view which corresponds to that of FIG. 5, and shows zoom driving times each required for the lenses controlled in the above manner to move from an arbitrary, zoom position to the next zoom position.

When the request for ceasing the zooming operation is made while the processes at steps SB1 to SB6 are repeatedly performed (YES at step SB7), CPU 13 finishes the zooming operation at such time.

As described above, the driving times of the zoom lens 2 and focus lens 3 are made to coincide with each other at all times while the zoom position is being changed, whereby the focus lens 3 can be kept in the vicinity of the focus position corresponding to the object distance and the position of the zoom lens 3 at all times during the zoom driving process, without controlling the focus driving rate frequently. Therefore, during the zooming operation, it is possible not only to keep the precise focused focal state at each of seven steps of zoom positions but also to keep a substantially precise focused focal state in each of zoom intervals. In other words, an out of focus state during the zooming operation can be kept in an allowable state by a simple control operation.

Further, a smooth zooming operation can be realized over the whole zoom range by controlling to keep the driving rates of the zoom lens 2 and focus lens 3 constant at all times to ensure the zooming operation rate as possible while the zoom magnification factor is being changed, without reducing the driving rates of both lenses 2, 3 beyond necessity.

In the present embodiment of the invention, the number of stages to which the zoom position can be set may arbitrarily be increased or decreased in the similar manner in the first embodiment. In case variation ranges in the zoom magnification factor are equivalent, more finely the zoom position is set, more precisely the focused focal state may be set during the zooming operation in each zoom interval. Further, a modification may be made, for example, so as to provide the zoom key with an adjusting function of adjusting the zooming operation rate by the user, whereby the driving times of the zoom lens 2 and focus lens 3 can be changed up to an upper limit of the driving time controlled and set in the above manner, in response to the rate adjusting operation performed by user during the zooming operation.

In the above embodiments, the digital camera equipment to which the present invention is applied has been described, but the present invention may be used for such camera equipment as built in a mobile information terminal including a cellular phone.

What is claimed is:

1. A camera having a zoom function and auto-focus function, comprising:

a distance-information obtaining unit for obtaining, in connection with a demand to alter zoom magnification, distance information representing an object distance immediately before altering the zoom magnification;

a zoom driving unit for driving a zoom lens;

a focus driving unit for driving a focus lens;

a storing unit for storing positions of the zoom lens corresponding to each of a plurality of zoom magnification factors, and position-control information related to the object distance and focus positions of the focus lens, which are based on the positions of the zoom lens and the object distance, in advance;

a drive controlling unit for controlling the zoom driving unit to drive the zoom lens and alter the zoom magnification in response to the demand to alter the zoom magnification factor, and for controlling the focus driving unit to drive the focus lens in synchronization with driving of the zoom lens by the zoom driving unit, and further for adjusting positions of the focus lens such that as the zoom magnification factor is set to the plurality of zoom magnification factors the focus positions of the focus lens are set to correspond to the object distance and the positions of the zoom lens represented by the distance information which is obtained by the distance-information obtaining unit based on the position-control information stored in the storing unit; and a driving-rate controlling unit for adjusting both a zoom driving rate at which the drive controlling unit controls the zoom driving unit to drive the zoom lens and a focus driving rate at which the drive controlling unit controls the focus driving unit to drive the focus lens to driving rates that make a zoom driving time of the zoom lens and a focus driving time of the focus lens coincide with each other in each of intervals corresponding respectively to the plurality of zoom magnification factors.

2. The camera according to claim 1, wherein the driving-rate controlling unit controls sets one of the zoom driving rate and the focus driving rate to a driving rate that makes a shorter one coincide with a longer one among shortest controllable driving times respectively in the zoom driving time of the zoom lens and in the focus driving time of the focus lens in each of intervals corresponding respectively the plurality of zoom magnification factors.

3. The camera according to claim 1, wherein the driving-rate controlling unit sets both the zoom driving rate and the focus driving rate to a driving rate at which the zoom driving time of the zoom lens, and the focus driving time of the focus lens are made equivalent to a longest one among shortest controllable driving times in the zoom driving times of the zoom lens and shortest controllable driving times in the focus driving times of the focus lens in all intervals corresponding respectively the plurality of zoom magnification factors.

4. The camera according to claim 1, further comprising:

an image pick-up unit for photographing an object through the zoom lens and the focus lens; and a focus controlling unit for controlling the image pick-up unit to perform a photographing operation continuously with the zoom lens being kept at rest while the focus driving unit is moving the focus lens along an optical axis, and for moving the focus lens to a peak position where continuously photographed images of the object is maximum in contrast, wherein the distance information obtained by the distance-information obtaining unit represents the peak position to which the focus lens is moved by the focus control unit.

5. A lens controlling method for controlling a zoom lens and focus lens in a camera having a zoom function and auto-focus function, the method comprising:

obtaining, in connection with a demand to alter zoom magnification, distance information representing an object distance immediately before altering the zoom magnification;

storing in advance positions of the zoom lens corresponding to each of a plurality of zoom magnification factors, and position-control information related to the object distance and focus positions of the focus lens, which are based on the positions of the zoom lens and the object distance;

driving the zoom lens to alter the zoom magnification in response to the demand to alter the zoom magnification factor;

driving the focus lens in synchronization with driving of the zoom lens;

adjusting positions of the focus lens such that as the zoom magnification factor is set to the plurality of zoom magnification factors the focus positions of the focus lens are set to correspond to the object distance and the positions of the zoom lens represented by the distance information which is obtained based on the stored position-control information; and adjusting both a zoom driving rate of the zoom lens and a focus driving rate of the focus lens to driving rates that make a zoom driving time of the zoom lens and a focus driving time of the focus lens coincide with each other in each of intervals corresponding respectively to the plurality of zoom magnification factors.

6. A computer readable storage medium having stored thereon a computer program for controlling a zoom lens and focus lens in a camera having a zoom function and auto-focus function, said program controlling the camera to realize functions of:

a distance-information obtaining unit for obtaining, in connection with a demand to alter zoom magnification, distance information representing an object distance immediately before altering the zoom magnification;

a storing unit for storing positions of the zoom lens corresponding to each of a plurality of zoom magnification factors, and position-control information related to the object distance and focus positions of the focus lens, which are based on the positions of the zoom lens and the object distance, in advance;

a drive controlling unit for controlling a zoom driving unit to drive the zoom lens and alter the zoom magnification in response to the demand to alter the zoom magnification factor, and for controlling a focus driving unit to drive the focus lens in synchronization with driving of the zoom lens by the zoom driving unit, and further for adjusting positions of the focus lens such that as the zoom magnification factor is set to the plurality of zoom magnification factors the focus positions of the focus lens are set to correspond to the object distance and the positions of the zoom lens represented by the distance information which is obtained by the distance-information obtaining unit based on the position-control information stored in the storing unit; and a driving-rate controlling unit for adjusting both a zoom driving rate at which the drive controlling unit controls the zoom driving unit to drive the zoom lens and a focus driving rate at which the drive controlling unit controls the focus driving unit to drive the focus lens to driving rates that make a zoom driving time of the zoom lens and a focus driving time of the focus lens coincide with each other in each of intervals corresponding respectively to the plurality of zoom magnification factors.

* * * * *